April 10, 1951  C. H. DICKE  2,548,424
TEMPERATURE CONTROL SYSTEM WITH SIGNAL
Filed March 13, 1946  5 Sheets-Sheet 3

Fig. 7

INVENTOR
Carl H. Dicke
BY
A. A. Dicke
L. C. Krazinski
ATTORNEYS

Patented Apr. 10, 1951

2,548,424

UNITED STATES PATENT OFFICE 2,548,424

TEMPERATURE CONTROL SYSTEM WITH SIGNAL

Carl H. Dicke, New Bremen, Ohio, assignor, by mesne assignments, to Crown Controls Company, Inc., New Bremen, Ohio, a corporation of Ohio Application March 13, 1946, Serial No. 654,052

6 Claims. (Cl. 236—9)

This invention relates to temperature control systems and a thermostat for use therewith, and relates more particularly to such a system in which indicating means, such as a signal lamp, is provided, so constructed and arranged that it will be in signal-producing condition at all times when the heat supply controlling device, such as a damper regulator motor, gas valve, relay, or the like, is in increased-heat position.

An object is to provide such a system in which the effectivity of the signal device, such as a lamp, is determined, not by the position of the heat-supply controlling device, such as a damper motor, but by the thermostat itself, whereby the signal is effective not only after the increased heat-supply position of the heat-supply controlling device has been raised but even during the operation thereof.

Another object is to provide such a system so arranged that the signal will truly indicate the condition or approaching condition of the heat supply control device irrespective of whether the heat-supply controlling device, such as a damper motor, has been actuated in response to the call of the thermostat, the call of a limit switch, or the call of a basement switch.

Another object of the invention is to provide such a system in which the signal given during the time while the heat-supply controlling device is being actuated differs from the type of signal given after the operation has been completed.

Another object is to provide such a device which is so arranged that operation of the temperature-adjusting means of the thermostat is ineffective to de-energize the signal lamp when the basement switch is on call, or when the low-limit switch is on call.

Another object is to provide a room thermostat of improved construction especially adapted for use in such a system.

Other objects are to provide improved signal lamp mounting means, convenient and reliable adjustment means for such thermostats, convenient and reliable means for attaching the cover thereof, to provide effective signal-indicating means on the cover and to provide means to prevent dust collecting on the contacts.

Another object of the present invention is to provide a damper regulator motor designed to cooperate with the signal lamp of the present invention.

Further objects and advantages of this invention will be apparent from consideration of the specification as illustrated by the accompanying drawings of possible embodiments of the invention, in which drawings.

Referring to said drawings, the letter T indicates generally a room thermostat and the letters DM indicate generally a damper motor. The thermostat comprises a thermal-responsive element, such as the coiled bi-metal element 11, carried by a bracket 12, which is connected through conductor 13b with terminal 13a, to which is connected conductor 13. 14 represents the "on call" contact, connected through conductor 15b with terminal 15a to which is connected conductor 15, and 16 represents the "off call" contact, connected through conductor 17b with terminal 17a, to which is connected conductor 17.

The heat supply control device may consist of a damper regulator motor of standard construction, or may comprise a relay for controlling an oil burner, or for controlling the operation of the motor of a stoker, or may be an electrically-operated gas valve. In the form shown, the heat supply control device consists of an electric motor 21 connected through suitable gearing (not shown) to drive, at a much reduced speed, the shaft 22, which carries cranks 23 and 24 for operating the draft and check dampers of a solid-fuel heating plant. Usual or suitable commutating means are provided. As shown, this takes the form of a metal tube 25, shown in development in dotted lines, carried for rotation by shaft 22. It is formed with two insulating areas 25a and 25b. Cooperating with said tube are four brushes 26, 27, 28 and 29. Brush 26 is connected through conductor 30 with motor 21, the other side of which is connected through conductor 31 and terminal 32 to the secondary winding 33 of a transformer 34, whose primary winding 35 is connected to a suitable source of alternating current. The other side of the winding 33 is connected through terminal 36 and conductor 37 with brush 28 and with terminal 38, to which conductor 13 is connected. Brush 27 is connected through conductor 39 to "on" terminal 40, to which terminal is connected the conductor 15. Brush 29 is connected through conductor 41 with the "off" terminal 42, to which is connected the conductor 17.

50 indicates a signal device, preferably a small electric lamp which not only serves to indicate the condition of the heat supply controlling device, but also serves as a supplemental heat source for increasing the sensitivity of the thermostat, as will be described more fully hereinafter. Said lamp is connected through conductor 51 with a terminal 52, to which is connected conductor 53, the other end of which is connected to terminal 32 of the damper motor and thus to that side of the transformer secondary which is directly connected through conductor 31 with the motor 21. The other side of the lamp 50 is connected through conductor 54 with the "on call" contact 14.

Figures 1, 5, 5A:
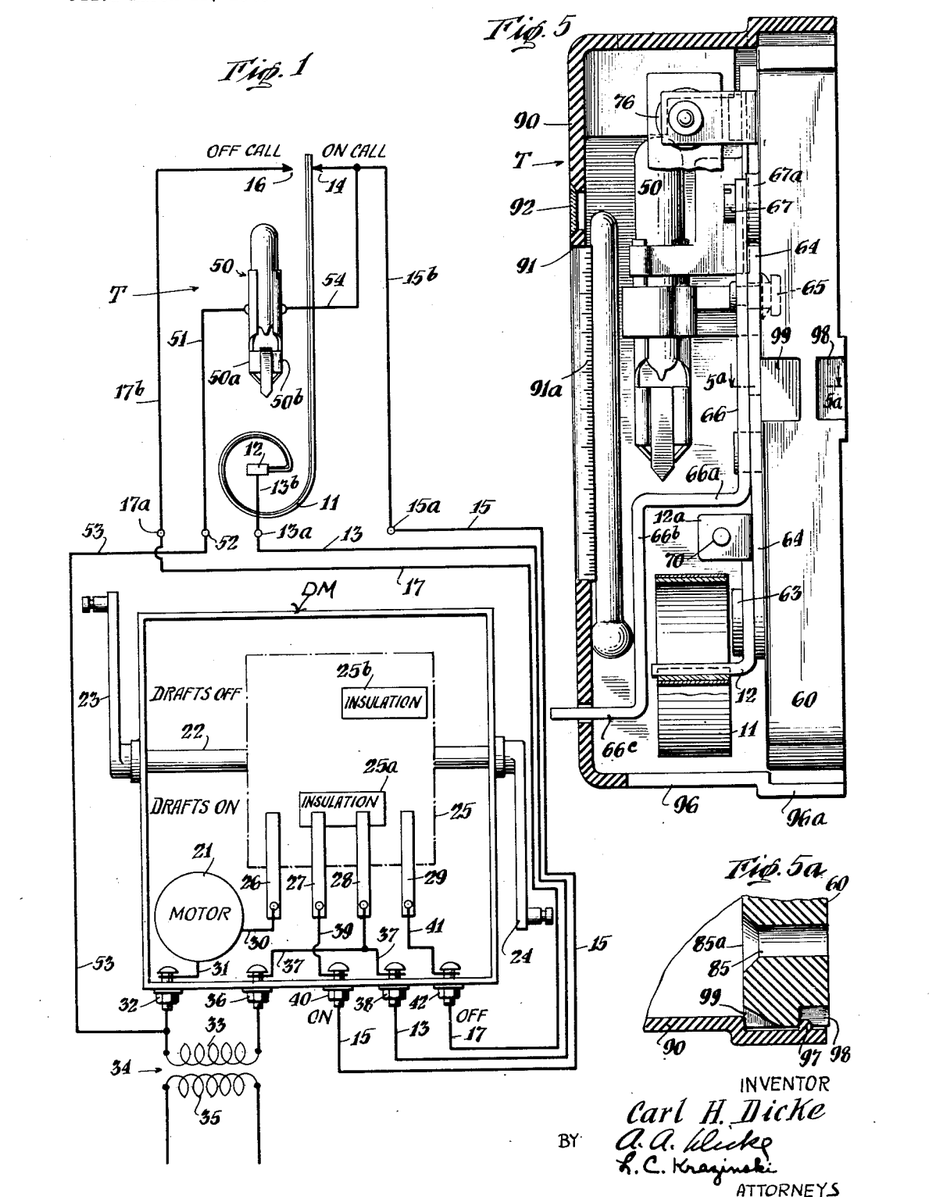
Fig. 1 illustrates a temperature control system showing more or less schematically a thermostat embodying the signal means of the present invention connected to a heat supply controlling device, such as a damper regulator motor.
Fig. 5 is a side view of the thermostat of Fig. 2 with the cover thereon, the cover being shown in generally vertical, longitudinal section, except that the upper part is shown in section taken to the right of the center of the instrument.
Fig. 5A is a fragmentary section of the base and cover.
Figure 2:
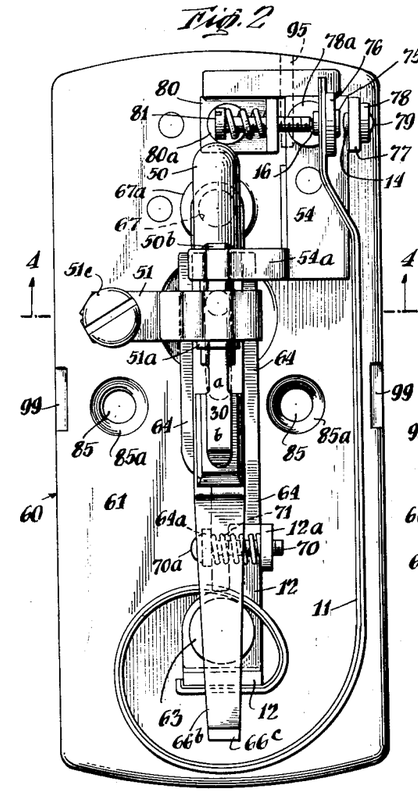
Fig. 2 is an elevational view of a room thermostat embodying the invention, the usual cover having been removed.

Before describing the details of the thermostat, the functions and operation of the system itself, as shown in Fig. 1, will be described.

Fig. 1 shows the parts in position where the damper motor has moved to "drafts on" position in response to the call of the thermostat T, due to an electrical connection between bi-metal element 11 and contact 14. The operation of motor 21 has terminated as a result of the insulation 25a coming under brush 27. It will be noted, however, that a circuit is open from the transformer secondary 33, terminal 32, through conductor 53, terminal 52, conductor 51, through lamp 50, conductor 54, "on call" contact 14, bi-metal element 11, bracket 12, conductor 13b, terminal 13a, conductor 13, terminal 38, conductor 37, terminal 36 to the other side of the transformer secondary. This circuit is completed solely through the bi-metal element 11 contacting the "on call" contact 14 and the lamp will, therefore, continue illuminated as long as the thermostat is in the position shown. This condition is quite independent of the commutating means in the damper motor. During this time heat from the lamp 50 is conducted to the bi-metal element 11 and serves, together with a resulting rise in the temperature of the room, to cause the bi-metal element 11 to move to the left. This operation is preferably of the "snap action" type, so that the bi-metal leaves the "on call" contact 14 and immediately makes connection with the "off call" contact 16. This breaks the circuit through lamp 50 and causes it to be extinguished. The circuit is, however, completed from transformer secondary 33, terminal 32, conductor 31, through motor 21, conductor 30, brush 26, metallic tube 25, brush 29, conductor 41, terminal 42, conductor 17, terminal 17a, conductor 17b, "off call" contact 16, bi-metal 11, bracket 12, conductor 13b, terminal 13a, conductor 13, terminal 38, conductor 37, and terminal 36 to the other side of the transformer secondary. This energizes motor 21 and causes it to rotate shaft 22 to move the damper motor to "drafts off" position. As soon as the insulation 25a moves from under both brushes 27 and 28, the lamp 50 will be energized through the circuit comprising conductor 53, terminal 52, conductor 51, lamp 50, conductor 54, conductor 15b, terminal 15a, conductor 15, terminal 40, conductor 39, brush 27, metallic tube 25, brush 28, conductor 37, and terminal 36 back to the other side of the transformer secondary. This circuit will be maintained only until insulation 25b moves under brush 28 at the end of the operation to the "drafts off" position of the damper motor. With the transformer 34 of the size usually used, the voltage of its secondary winding 33 is considerably reduced, due to the current flowing through motor 21. Therefore, while the lamp 50 is illuminated during the operation of the damper motor from the "drafts on" to the "drafts off" position, the lamp will not be fully illuminated, but only partially. The damper motor is now in the "drafts off" position and the lamp 50 is extinguished, due to the bi-metal element 11 not being in contact with the "on call" contact 14.

If now, the temperature drops, or for any other reason bi-metal 11 is moved from the "off call" contact 16 to the "on call" contact 14, the lamp will be immediately illuminated through the circuit including bi-metal element 11, as previously described. During the operation of the damper motor from "drafts off" to "drafts on" position, the lamp will be dimly illuminated, due to the voltage drop in the transformer secondary. However, at the end of the operation, the lamp will be illuminated brightly and will remain illuminated, thus signalling to the user that the damper motor is in "drafts on" position. During this time the heat radiated by lamp 50 affects bi-metal element 11 and causes it to move from "on call" contact 14 to the "off call" contact 16 earlier than it would do otherwise, so that the sensitivity of the thermostat is increased thereby. It will be noted also that when the motor 21 is operated to either the "drafts off" or the "drafts on" position, the lamp 50 will be illuminated dimly and thus signal to the user that a change in draft position is taking place. The novel system just described has the advantage that the illumination of the signal lamp 50 is controlled by the thermostat bi-metal itself and is independent of the particular type of commutator, if any, which may be present in the heat supply control device with which it is employed.

The thermostat

The thermostat illustrated in Figs. 2 to 6, inclusive, comprises a base 60 formed of a suitable insulating material, preferably of molded plastic material, having a forward face 61 and shown as formed with rim 62 extending rearwardly therefrom. Pivotally mounted as upon the rivet 63 is the bracket 12 supporting the bi-metal element 11. Also mounted on rivet 63 and directly under the horizontal portion of bracket 12 is the shifting fork member 64, extending upwardly therefrom and being split near its upper end, as appears from Fig. 4, to receive a rivet 65 having a head 65a, against which bears a cupped spring washer 66d, the outer rim of which bears against the forked portion of member 64. The rivet 65 is carried by the adjusting lever 66, which overlies the shifting fork 64 and is pivoted by means of screw or rivet 67. The adjusting lever has an outward extension 66a (see Fig. 5) to which is attached the vertical extension 66b, carrying, in turn, the horizontal extension 66c, which projects through the cover and provides a manually adjustable member which also serves as a pointer to indicate the setting of the instrument through the agency of the usual scale (not shown) on the front of the cover. The bracket 12 is provided with a projection 12a threadably receiving an adjusting screw 70, the head 70a of which bears against a projection 64a, forming part of the shifting fork 64. Interposed between the members 12a and 64a is a coiled spring 71, tending to force said members apart. By turning screw 70, the position of the bracket 12 relative to the shifting fork 64 may be readily adjusted.

In the form shown, the upper end of the bi-metal element 11 is provided with a contact rivet 75, which may conveniently serve to attach to the element 11 a soft steel washer 76, serving as an armature for a permanent magnet 77 supported upon a contact bracket 78 by means of a rivet 79 of good contact material, one end of which comprises the "on call" contact 14, shown schematically in Fig. 1. The contact bracket 78 is attached to the base by means of rivet 78a. 80 indicates another contact bracket attached to the base by rivet 80a. It carries a contact screw 81 formed with a contact point 16, forming the "off call" contact 16 shown in Fig. 1.

The lamp 50 is conveniently supported by means of a spring clip 51, which forms the conductor 51 shown in Fig. 1. Said clip surrounds the lamp 50, which may be of the usual telephone signal lamp type and makes contact with the contact terminal 50a of the lamp. Contact with the other terminal 50b of the lamp is prevented by the insulating material 51a. The clip 51 is shown supported upon a metal post 51b by means of screw 51c. It is imbedded in the base 60 and receives at its other end the terminal screw 52, corresponding to the terminal 52 of Fig. 1.

The other terminal 50b of the lamp is contacted by means of the conducting piece 54, corresponding to the conductor 54 in Fig. 1, which is provided with a contact finger 54a bearing on lamp contact 50b, and is held in place by the rivet 78a, and is, therefore, in electrical connection with the "on call" contact 14. It will, therefore, be seen that through the means shown, the lamp 50 is connected in the circuit in the manner indicated schematically in Fig. 1.

It will also be seen that the lamp 50 may be readily replaced by removing the screw 51c, whereupon the burned out lamp, together with its clip 51, may be removed and replaced by another lamp and clip. The lamp, clip, and insulating material 51a will, therefore, form a separate article of manufacture.

The openings 85 in the base, preferably flared as at 85a, serve to receive attachment screws for securing the thermostat base to a wall. For this purpose, the base is formed solid adjacent said holes, as indicated at 86 in Fig. 3. These lugs serve to support the pressure of the holding screws whereby distortion of the base is prevented.

Figure 3:
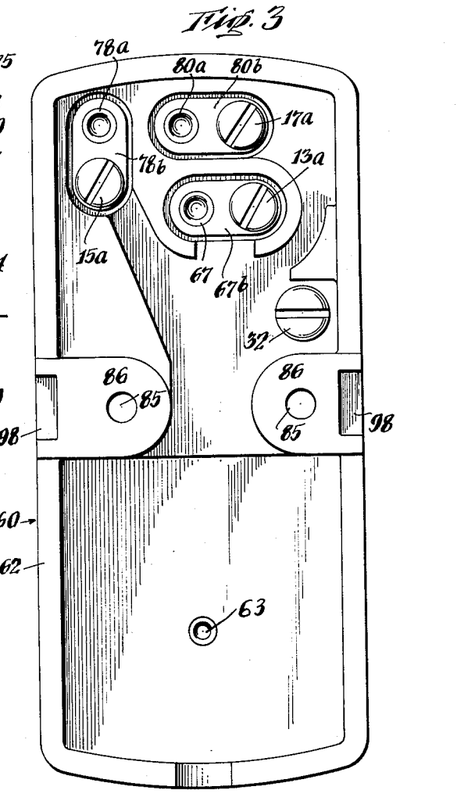
Fig. 3 is a rear elevational view of the structure of Fig. 2.

By referring to Fig. 3, it will be noted that rivet 78a, after passing through the base material, also passes through a terminal link 78b, which serves as a riveting washer. At its other end it is formed with a threaded opening to receive the terminal screw 15a. Similarly, rivet 80a is riveted through terminal link 80b, which carries the terminal screw 17a. Likewise, the pivot rivet 67 is riveted into terminal link 67b, which carries the terminal screw 13a. By referring to Figs. 2 and 5, it will be noted that the base 60 is formed adjacent the rivet 67 with a raised boss 67a against which the adjusting lever 66 bears. This provides clearance under the lever 66 to accommodate the forked lever 64.

Figures 4, 6:
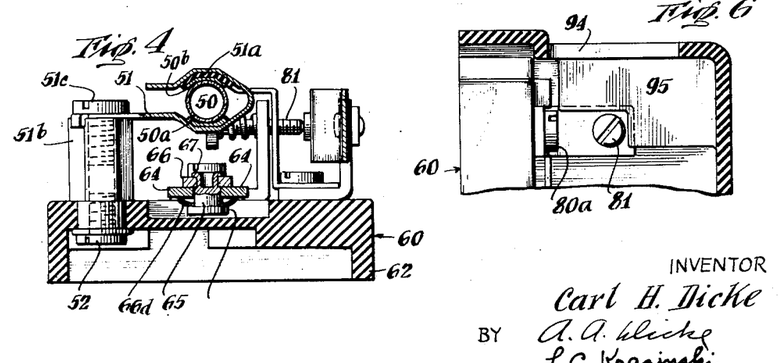
Fig. 4 is a cross-sectional view taken on the line 4—4 of Fig. 2.
Fig. 6 is a fragmentary vertical, longitudinal section of the thermostat shown in Fig. 5.

Referring to Fig. 5, it will be noted that a cover 90 is provided. This serves to protect the mechanism and carries, in the usual manner, a thermometer tube 91 adjacent the thermometer scale 91a on the face of the cover. The cover is preferably of translucent material so that light from the lamp 50 may illuminate the cover generally. It is preferred, however, to provide a window 92 of suitable colored translucent plastic or glass to make the light from lamp 50 more readily visible. The upper end of the cover 90 is provided with a preferably centrally located opening 94 (Fig. 6). Adjacent said opening a baffle 95 is preferably provided to shield the contact points from dust, which might otherwise settle thereon. The location of this baffle is indicated in dotted lines in Fig. 2. A corresponding opening or openings 96 are formed at the bottom of the cover. At least one of these openings, as shown at 96a, extends to the bottom of the cover to provide flexibility of the cover when applying or removing it from the base. The cover is held in place on the base by any suitable means, such as a small lug 97 (Fig. 5A) formed on the inside of the cover, which lug engages behind the shoulders 98 formed in the base. To facilitate application of the cover and to cause it to be sprung apart during application to the base, the base is preferably formed also with recesses 99, having inclined faces. During the application of the cover, the lugs 97 bear against the inclined faces 99, causing the cover to be spread apart. The lugs 97 thereupon spring in place behind the shoulders 98. The lugs 97 and the edge of the shoulders 98 are rounded so that it will be possible to withdraw the cover. By placing the recesses 98 at the extreme bottom of the base, the formation thereof presents no difficulties in the molding operation, since they may be formed by a corresponding extension on the mold. Similarly, the molding of the cover with lugs 97 thereon presents no difficulties, since the cover is sufficiently elastic to permit the lugs 97 to be forced out of corresponding recesses in the mold when the cover is stripped from the mold core.

Figure 7:
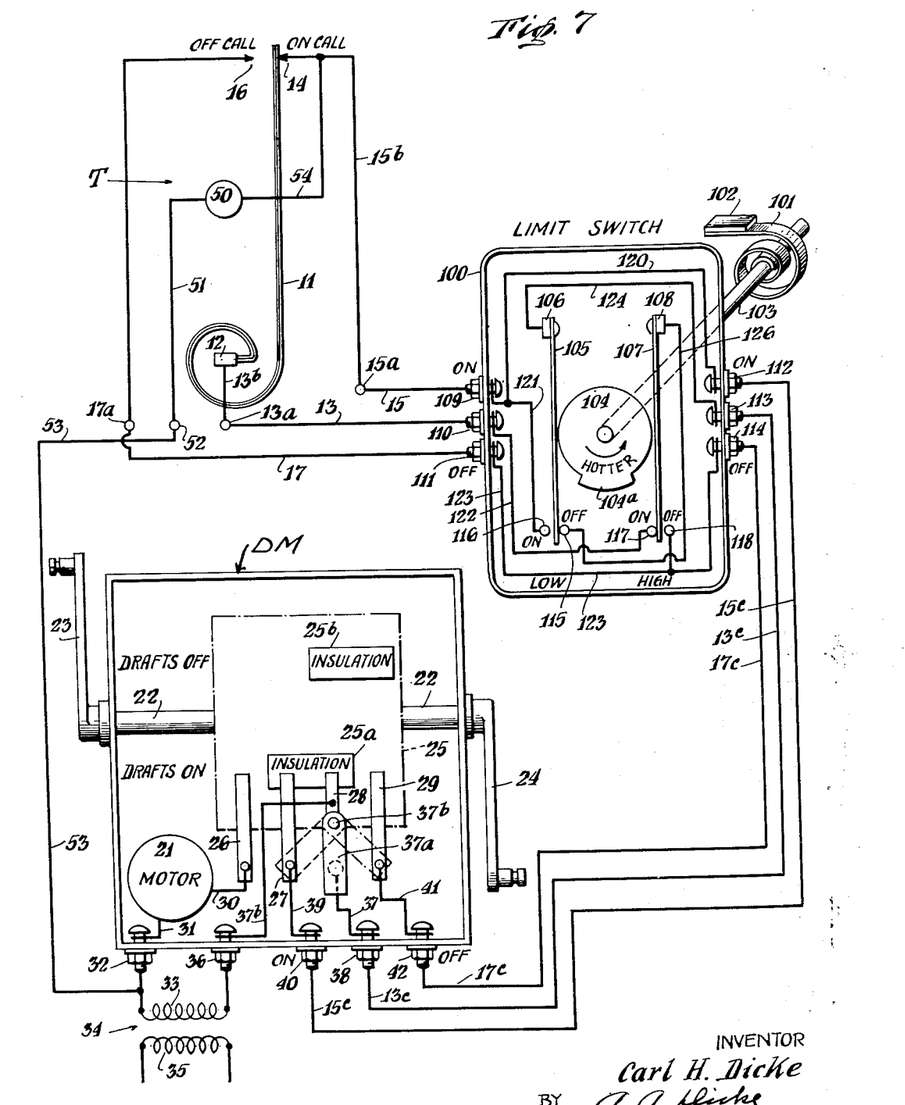
Fig. 7 illustrates a temperature control system showing more or less schematically a thermostat embodying the present invention connected to a heat-supply controlling device, such as a damper regulator motor, said damper motor being provided with the conventional on and off "basement switch," the system also including a high limit switch and a low limit switch connected between the thermostat and the damper motor.

Fig. 7 illustrates a temperature control system employing the thermostat of the present invention connected to a damper regulator motor provided with a "basement switch," the system also including a high limit switch and a low limit switch of conventional construction connected between the thermostat and the damper motor. The same reference numerals have been employed as in the other figures, insofar as applicable, and a further description of the construction common to Figs. 1 and 7 will, therefore, not be necessary. The damper motor of Fig. 7 may be identical with the damper motor of Fig. 1, with the exception of the "basement switch." This consists of a switch arm 37a pivoted at 37b to the brush 28. Its other end is normally connected with conductor 37, as shown. As indicated in dotted lines, switch arm 37a may be swung away from conductor 37 and into contact with brush 29 and conductor 41, as shown in dotted lines, or it may be swung in the other direction into contact with brush 27 and conductor 39, as shown in dotted lines.

The high-low limit switch may be of conventional construction. It may consist, for example, of thermo-responsive material, such as the bi-metal 101, fixed to a supporting bracket 102 and attached at its other end to a shaft 103 carrying cam 104 provided with a projection 104a. Mounted to one side of said arm is the low-limit contact blade 105, carried by bracket 106 and normally spring-pressed to the right against the contact 115. Opposite thereto is the "on" contact 116. On the other side of the cam is a high limit spring contact arm 107, carried by bracket 108 and normally spring-pressed to the left and engaging the contact 117. Opposite thereto is the "off" contact 118. There are provided terminals 109, 110 and 111 to which are connected conductors 15, 13 and 17, respectively. There are also provided terminals 112, 113 and 114 to which are connected respectively conductors 15c, 13c and 17c which are connected respectively to the terminals 40, 38 and 42 of the damper motor. The terminal 109 is connected to the terminal 112 by conductor 120 and it is also connected by conductor 121 with contact 116. Terminal 110 is connected via conductor 122 with contact 117. Terminal 111 is connected via conductor 123 with "off" contact 118 and "off" terminal 114. Terminal 113 is connected via conductor 124 to bracket 106. Bracket 108 is connected via conductor 126 with contact 115. It will be noted that the parts are so connected that in the positions of the parts shown a circuit is completed from terminal 13a of the thermostat through conductor 13, terminal 110, conductor 122, high limit contact 117, spring arm 107, bracket 108, conductor 126, contact 115, spring arm 105, bracket 106 and conductor 124 to terminal 113, to which is connected the conductor 13c which connects with terminal 38 on the damper motor. Likewise, conductor 17, which leads from terminal 17a on the thermostat, leads to terminal 111 on the limit switch and thence connects through conductor 123 to terminal 114, which is connected through conductor 17c with terminal 42 on the damper motor. Terminal 15a of the thermostat is connected via conductor 15 with terminal 109 on the limit switch, wherefrom it is connected by means of conductor 120 with terminal 112 which is connected through conductor 15c with the terminal 40 of the damper motor.

It will be noted that with the limit switch in the position shown in Fig. 7, and the "basement switch" in the position there shown, the circuit as between the thermostat and damper motor is the same as in Fig. 1. In other words, there is an electrical connection between the thermostat bi-metal bracket 12 and the brush 28, and through conductor 37b to the transformer secondary terminal 36. Likewise, there is an electrical connection from the thermostat "on" contact 14 to the damper motor "on" terminal 40 and brush 27. This is effected through conductor 15b, thermostat terminal 15a, conductor 15, limit switch terminal 109, conductor 120 to terminal 112, and through conductor 15c, terminal 40 and conductor 39 to brush 27.

Likewise, as in Fig. 1, a circuit is established from the "off" contact 16 of the thermostat to the "off" terminal 42 of the damper motor and to the brush 29. This is effected through the conductor 16, conductor 17b, thermostat terminal 17a, conductor 17, limit switch terminal 111, conductor 123, terminal 114, conductor 17c to damper motor terminal 42, conductor 41 and brush 29.

Likewise, (assuming the thermostat to be in the "on call" position) a circuit is established from the transformer secondary at the terminal 32, through conductor 53, the lamp 50, conductor 54, contact 14, bi-metal arm 11, through conductors 13b, terminal 13a, and conductor 13 to terminal 110 of the limit switch, and thence through conductor 122, contact 117, blade 107, bracket 108, conductor 126, contact 115, blade 105, bracket 106, conductor 124, terminal 113, and conductor 13c, terminal 38, conductor 37, basement switch blade 37a, brush 28, conductor 37b and terminal 36 to the other side of the transformer secondary. The lamp 50 will, therefore, remain illuminated while the bi-metal arm 11 remains in contact with the thermostat "on call" contact 14.

By following the circuits shown in Fig. 7, it will be noted that the lamp 50 will always be illuminated whenever the damper motor is in the "drafts on" position, whether this be the result of the call of the room thermostat (circuit just described), or as a result of the call of the basement switch, or as a result of the call of the low limit switch. The eighteen possible conditions and the resultant action can be seen from the following table:

| No. | Room Thermostat | Basement Switch | Limit switch | | If any operation occurs drafts are turned | Light 50 |
|---|---|---|---|---|---|---|
| | | | Low Limit | High Limit | | |
| 1 | on call | normal | normal (off call) | normal (on call) | on | Dim while motor runs, then bright. |
| 2 | off call | do | do | do | off | Dim while motor runs, then out. |
| 3 | on call | on call | do | do | on | Dim while motor runs, then bright. Can't turn off light at thermostat. |
| 4 | off call | do | do | do | do | Same as 3. |
| 5 | on call | off call | do | do | off | Same as 2. |
| 6 | off call | do | do | do | do | Do. |
| 7 | on call | normal | do | off call | do | Do. |
| 8 | off call | do | do | do | do | Do. |
| 9 | on call | on call | do | do | do | Do. |
| 10 | off call | do | do | do | on | Same as 3. |
| 11 | on call | off call | do | do | do | Do. |
| 12 | off call | do | do | do | off | Same as 2. |
| 13 | on call | normal | on call | normal | on | Same as 3. |
| 14 | off call | do | do | do | do | Do. |
| 15 | on call | on call | do | do | do | Do. |
| 16 | off call | do | do | do | do | Do. |
| 17 | on call | off call | do | do | off | Same as 2. |
| 18 | off call | do | do | do | do | Do. |

That these results are obtained will be readily apparent to those skilled in this art by tracing the circuit shown in Fig. 7. From said table it will be noted that the lamp always truly indicates the condition of the drafts, whether as a result of the call of the room thermostat, the "basement switch," or the limit switch. When the drafts are open, the lamp is illuminated and when the drafts are closed, the lamp is extinguished. Furthermore, if the user should leave the "basement switch" in "on call" position, the lamp cannot be turned off at the thermostat. If the thermostat-adjusting pointer 66c is moved to a lower temperature position so that the bi-metal 11 moves from "on call" contact 14 to "off call" contact 16, the lamp will remain illuminated. This is the condition represented by operations numbers 3 and 4 in the above table. Similarly, the light cannot be turned off at the thermostat at any time when the "basement switch" is left in "on call" position, irrespective of the position of the limit switch. Thus, even if the high limit switch is in "off call" position and the basement switch in "on call" position (operation 9), the lamp is illuminated and when the thermostat is then moved to "off call" position (operation 10), the condition of the lamp is not affected. The fact that the lamp cannot be turned off at the thermostat is therefore an indication to the user that the "basement switch" has been left in its "open" position.

Figure 8:
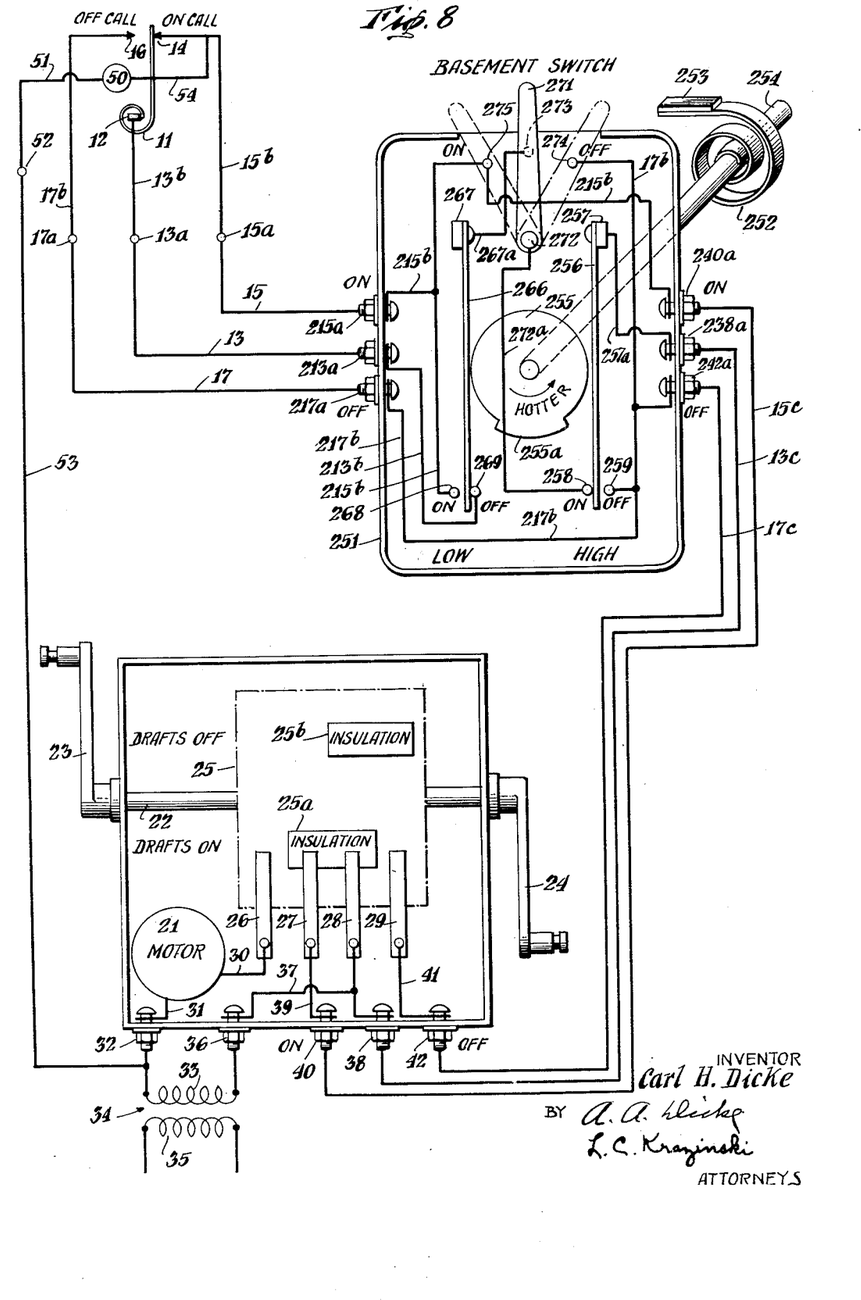
Fig. 8 illustrates the present invention as used with a limit switch having a basement switch embodied therein.

Fig. 8 illustrates a temperature control system employing the thermostat of the present invention connected to a damper motor not provided with a "basement switch," the system however, including a high limit switch and a low limit switch of the type having a "basement switch" incorporated therein, such as the limit switch disclosed and claimed in the pending application of Allen A. Dicke, Jr., filed January 25, 1946, Serial No. 643,343, now Patent No. 2,504,010, dated April 11, 1950.

The same reference numerals have been employed as in the preceding figures, insofar as applicable, and a further description of the material common to Fig. 8 and the earlier figures is therefore unnecessary. The thermostat and the damper motor of Fig. 8 may be identical with those shown in Fig. 1. The high-low limit-basement switch comprises a casing 251 which houses the high limit switch, the low limit switch, and their operating means, as well as the basement switch.

252 represents any thermo-responsive element, such as coiled bi-metal, one end of which is attached to an abutment member 253 and the other end of which is attached to a rotatable shaft 254, the other end of which is connected for rotating the cam-operating member 255. In accordance with usual construction, the shaft 254 is suitably housed in a rearwardly-extending tube which, in use, extends into the bonnet of a hot air furnace or the flue pipe of any type of furnace.

The high limit switch may consist essentially of a switch blade 256 supported on bracket 257, its free end being biased against the "on" contact 258. The arm 256 is sufficiently flexible so that when operating cam 255 is rotated so that its high point 255a strikes the arm 256, said arm is moved away from "on" contact 258 into engagement with the "off" contact 259.

The low limit switch is shown as consisting of a flexible contact blade 266 supported by bracket 267 and normally engaging "off" contact 269 but it may be moved by extension 255a of the cam to move away from contact 269 into engagement with "on" contact 268.

The basement switch consists essentially of a switch lever 271 pivoted at 272 and normally in electrical connection with contact button 273. It may be moved in one direction so as to leave the contact 273 and engage the "off" contact button 274. Similarly, it may be moved in the other direction to engage the "on" contact button 275.

The housing 251 is shown provided with terminals as follows: 215a to which conductor 15 is attached, 213a to which conductor 13 is attached, and 217a to which conductor 17 is attached.

Similarly, the housing carries terminals 240a connected through conductor 15c with terminal 40 on the motor, as well as terminal 238a which is connected through conductor 13c with terminal 38 on the motor, and also terminal 242a which, through conductor 17c, is connected to terminal 42 on the motor.

Internal connections are as shown, viz., terminal 215a is connected through conductor 215b to the "on" contact 268 of the low limit switch, the "on" contact 275 of the basement switch, and the "on" terminal 240a, and thence through conductor 15c to the "on" terminal 40 of the motor. Terminal 213a is connected through conductor 213b with the "off" contact 269 of the low limit switch. Terminal 217a is connected through conductor 217b to the "off" contact 259 of the high limit switch, to the "off" contact 274 of the basement switch, and to the "off" terminal 242a which, through conductor 17c, is connected to the "off" terminal 42 of the motor. The bracket 267 is connected to the contact 273 of the basement switch through conductor 267a. The pivot 272 of the basement switch is connected through conductor 272a with the "on" contact 258 of the high limit switch. The bracket 257 of the high limit switch is connected through conductor 257a with the terminal 238a and thence through conductor 13c with the common terminal 38 of the motor.

The thermostat T and the motor are shown in a position where an "on call" operation has just been completed. The motor 21 and shaft 22 are stationary because "on" brush 27 is standing on insulation 25a. If now, the temperature to which the limit-switch bi-metal 252 is subjected rises to a certain extent, cam 255 will rotate counterclockwise until extension 255a thereon strikes switch blade 256, moving it from contact 258 to contact 259. A circuit is thereby established from transformer 34 through motor 21, conductor 30, brush 26, commutator tube 25, brush 29, conductor 41, terminal 42, conductor 17c, terminal 242a, conductor 217b, contact 259, blade 256, bracket 257, conductor 257a, terminal 238a, conductor 13c, terminal 38, conductor 37, terminal 36, back to the transformer. Therefore, the motor will operate until shaft 22 has been given a half-rotation and insulation 25b appears under the brush 29. This operation is independent of the position of the thermostat and of the basement switch. Thus, if the basement switch had been set at its "on" position it would have been unable to prevent the "off" operation just described, the internal circuit being complete from terminal 242a to terminal 238a merely through "off" contact 259 and contact blade 256. If now the basement switch is moved to the "on" position, an "on" operation is not brought about since the "on" circuit through terminal 240a, conductor 215b, contact button 275, conductor 215b, and contact 268 is interrupted at that point. This is very important since it assures that the high limit switch is master over the basement switch. Thus, if the user should leave the basement switch on the "on" position, it could not prevent an "off" operation upon excessive increase in temperature in the bonnet or stack which would represent a great fire hazard. Similarly, if the drafts have been turned off as a result of excessive temperatures in the bonnet or stack, it will not be possible to overcome its safeguarding action by moving the basement switch to the "on" position. The reason for this result is that the circuit is so arranged that the "off" circuit is dependent only upon the high limit switch and is independent of the basement switch and of the thermostat.

It will be noted, however, that the basement switch has mastery over the low limit switch. Thus, if the temperature in the bonnet or the stack is so low that the low limit switch is moved to the "on" position (which may occur when installation takes place in a cold furnace), the installation man may, in order to test the installation, move the basement switch to the "off" position and thereby secure an operation, irrespective of the position of the room thermostat.

Assuming that the motor is in the position shown, drafts on, as a result of the operation of the low limit switch, and that the basement switch is now moved to the "off" position, it will be noted that a circuit is established from the transformer through the motor 21, brush 26, conductor 30, tube 25, brush 29, conductors 41, 17c, 217b, contact button 274, lever 271, conductor 272a, "on" contact 258, blade 256, conductor 257a, conductor 13c, terminal 38, conductor 37, back to the transformer. This results in a half revolution of the shaft 22 until insulation 25b moves under brush 29. Thus, a drafts-off operation is completed in spite of the fact that the low limit switch is in "on" position.

ductor 267a, basement-switch arm 271, conductor 272a, contact 258, switch arm 256, conductor 257a, terminal 238a, conductor 13c, terminal 38, conductor 37, terminal 36, to the other side of the transformer secondary. If the room thermostat now moves to the "off-call" position, the lamp will be extinguished and the damper motor will be moved to the "drafts-off" position.

If now the low limit switch is moved to "on" position the arm 266 touches contact 268. Lamp 50 will be energized immediately through the following circuit; from the transformer secondary through conductor 53, terminal 52, conductor 51, lamp 50, conductors 54 and 15b, terminal 15a, conductor 15, terminal 215a, conductor 215b, contact 268, contact arm 266, bracket 267, conductor 267a, basement-switch arm 271, conductor 272a, contact 258, switch arm 256, bracket 257, conductor 257a, terminal 238a, conductor 13c, terminal 38, conductor 37, terminal 36 back to the other side of the transformer secondary. At the same time a circuit will be established through motor 21 as follows: terminal 32, conductor 31, motor 21, conductor 30, brush 26, tube 25, brush 27, conductor 39, terminal 40, conductor 15c, terminal 240a, conductor 215b, contact 268, switch arm 266, conductor 267a, basement-switch arm 271, conductor 272a, contact 258, switch arm 256, conductor 257a, terminal 238a, conductor 13c, terminal 38, conductor 37, terminal 36 to the other side of the transformer secondary. This will cause the damper motor to operate to the "drafts on" position.

By following the circuit shown in Fig. 8, it will be noted that the lamp 50 will always be energized whenever the damper motor is in the "drafts on" position, whether this be the result of the call of the room thermostat or as a result of the call of the basement switch or as a result of the call of the low limit switch. The eighteen possible conditions and the resultant action can be seen from the following table:

| No. | Room Thermostat | Basement Switch | Limit switch | | If any operation occurs drafts are turned | Light 50 |
|---|---|---|---|---|---|---|
| | | | Low Limit | High Limit | | |
| 1 | on call | normal | normal (off call) | normal (on call) | on | Dim while motor runs, then bright. |
| 2 | off call | do | do | do | off | Dim while motor runs, then out. |
| 3 | on call | on call | do | do | on | Dim while motor runs, then bright. Can't turn off light at thermostat. |
| 4 | off call | do | do | do | do | Same as 3. |
| 5 | on call | off call | do | do | off | Same as 2. |
| 6 | off call | do | do | do | do | Do. |
| 7 | on call | normal | do | off call | do | Do. |
| 8 | off call | do | do | do | do | Do. |
| 9 | on call | on call | do | do | do | Do. |
| 10 | off call | do | do | do | do | Do. |
| 11 | on call | off call | do | do | do | Do. |
| 12 | off call | do | do | do | do | Do. |
| 13 | on call | normal | on call | normal | on | Same as 1. |
| 14 | off call | do | do | do | do | Do. |
| 15 | on call | on call | do | do | do | Do. |
| 16 | off call | do | do | do | do | Do. |
| 17 | on call | off call | do | do | off | Same as 2. |
| 18 | off call | do | do | do | do | Do. |

It will be noted that the lamp 50 is connected to the thermostat and damper motor in the same way as in Figs. 1 and 7 and that when the parts are in the position shown in Fig. 8, the lamp will be energized through the following circuit; from transformer secondary winding 33 through conductor 53, terminal 52, conductor 51, lamp 50, conductor 54, contact 14, bi-metal 11, conductor 13b, terminal 13a, conductor 13, terminal 213a, conductor 213b, contact 269, switch arm 266, con- That these results are obtained will be readily apparent to those skilled in this art by tracing the circuits shown in Fig. 8. It will be noted that the lamp always truly indicates the condition of the drafts whether as a result of the call of the room thermostat, the basement switch, or the limit switch. When the drafts are open the lamp is illuminated and when the drafts are closed the lamp is extinguished.

Figure 9:
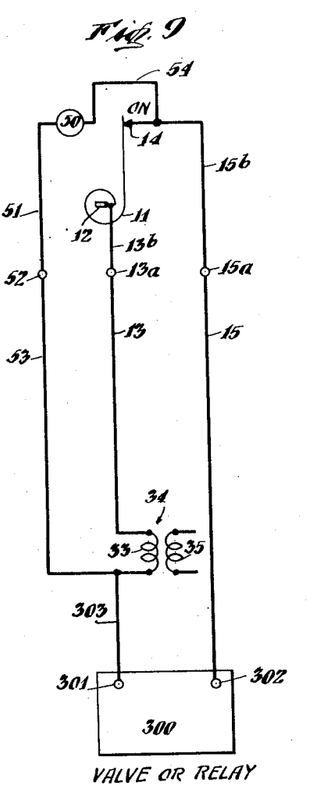
Fig. 9 illustrates a temperature control system in which the heat-supply control device consists of a solenoid fuel valve or a relay.
Figure 10:
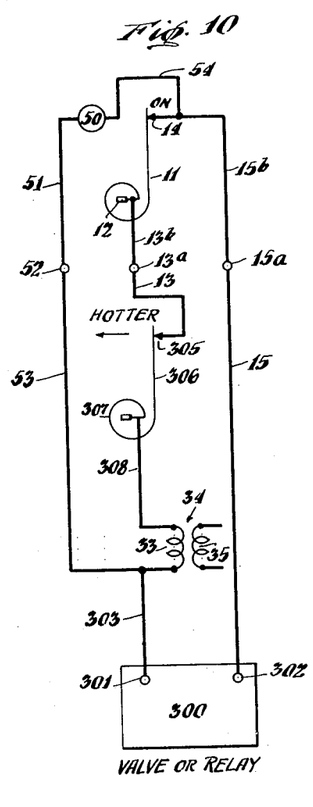
Fig. 10 illustrates such a system in which a high limit switch is employed.
Figure 11:
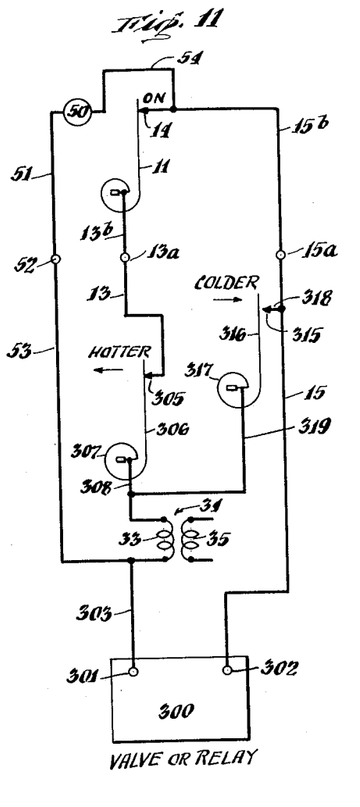
Fig. 11 illustrates such a system in which a high limit and a low limit switch are provided.

Referring to Figs. 9, 10 and 11, the thermostat parts are designated by the same reference numerals as those used in Fig. 1. The numeral 300 designates a heat-supply controlling device of any type requiring a single circuit, viz., such as a solenoid valve for controlling gas or liquid fuel, or hot water or steam, or a relay for controlling the motor circuit of a stoker or oil burner. Said device is provided with two terminals 301 and 302. The transformer secondary 33 is connected to the terminal 301 via conductor 303 and to conductor 53 and its other side is connected to the conductor 13. The terminal 15a is connected to the terminal 302 via conductor 15.

In the system of Fig. 9 it will be seen that when, upon falling temperature, contact is made between 11 and 14, two parallel circuits will be established, (1) through lamp 50 and (2) through the device 300. The lamp 50 will, therefore, be energized at all times when the device 300 is energized.

Referring to Fig. 10, the conductor 13, instead of connecting directly with winding 33, is connected to a contact 305 against which may bear a contact blade 306 actuated by the thermo-responsive element 307 which is connected through conductor 308 with the winding 33. This system will operate in the same manner as the system of Fig. 9 whenever contact exists between 305 and 306. However, if a certain limiting temperature is achieved, as in the bonnet of a hot-air furnace or the stack of any furnace (or if certain pressure is achieved, assuming the element 307 to be pressure-responsive), the circuit is broken at 305 and 306 causing the lamp 50 to be extinguished and the device 300 to be de-energized.

The device of Fig. 11 is identical with that of Fig. 10 with the exception that a second temperature or pressure-responsive member 317 is provided having a contact member 316 co-operable upon drop in temperature or in pressure with contact 315 connected via conductor 318 with the conductor 15. Said member 317 is connected through conductor 319 with the conductor 308 and the winding 33.

In the system of Fig. 11 the temperature-responsive element 11 and, on occasion, the temperature-responsive element 307, controls energization of device 300 and simultaneously of the lamp 50. If, however, as in mild weather, the element 11 is satisfied for a sufficiently long time to permit the temperature of the bonnet or stack (or the pressure) to drop sufficiently far to cause element 316 to engage contact 315, the device 300 will be energized and simultaneously the lamp 50 illuminated, even though element 11 does not call for heat. Device 300 is energized through the circuit from winding 33 via conductor 319, element 316, contact 315, conductor 318, conductor 15, terminal 302, device 300, terminal 301, conductor 303, to the other side of the winding. Simultaneously, a circuit is completed via conductor 15, terminal 15a, conductor 15b, conductor 54, lamp 50, conductor 51, terminal 52, conductor 53, back to the winding 33.

It will be seen that according to the devices of Figs. 9, 10 and 11, the lamp 50 will always be illuminated when the device 300 is energized and at no other time. This is true in Fig. 11 whether such energization takes place as a result of a call by the thermostat 11—14 or of the low limit switch 316—315. Likewise, if de-energization of device 300 occurs, the lamp 50 will be extinguished, whether such de-energization occurs because the room thermostat is satisfied or because the high limit switch of Figs. 10 or 11 is satisfied. Therefore, the lamp 50 will always truly indicate the condition of the device 300.

It will be noted that the construction shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a temperature control system of the type having a thermostat including a thermo-responsive switch, a combined high and low limit switch, a heat-supply controlling device, a plurality of conductors connecting said switch for controlling said heat-supply controlling device via said limit switch, and an electric source connected to for operating said heat-supply controlling device; the combination of a lamp so associated with said thermostat that heat therefrom, when energized, affects said thermo-responsive switch and a conductor leading from one terminal of said lamp to said electric source, the other side of said lamp being connected to the other side of said electric source via said thermo-responsive switch and one of said plurality of conductors.

2. In a temperature control system of the type having a thermostat including a thermo-responsive single-pole double-throw switch, a single-pole double-throw limit switch, a heat-supply controlling device, a plurality of conductors connecting said switch for controlling said heat-supply controlling device via said limit switch, and an electric source connected to for operating said heat-supply controlling device; the combination of a lamp so associated with said thermostat that heat therefrom, when energized, affects said thermo-responsive switch and a conductor leading from one terminal of said lamp to said electric source, the other side of said lamp being connected to the other side of said electric source via said thermo-responsive switch, one of said plurality of conductors and said limit switch.

3. In a temperature control system, a thermo-responsive switch, a high limit switch, a low limit switch, a heat-supply controlling device, an electric source, an electric heat source so associated with said thermo-responsive switch that heat therefrom, when energized, affects said thermo-responsive switch and conductors so interconnecting said switches, said electric source, said heat source and said controlling device that closing of either said thermo-responsive switch or said low limit switch will, when the high limit switch is closed, establish parallel circuits from said electric source, one circuit through said heat source and one circuit through said controlling device, and that opening of said high limit switch will break both of said parallel circuits irrespective of the setting of said thermo-responsive switch and said low limit switch.

4. In a temperature control system of the type having a thermostat including a thermo-responsive switch, a heat-supply controlling device, a plurality of conductors connecting said switch to said heat-supply controlling device, and an electric source connected to for operating said heat-supply controlling device; the combination of a lamp so associated with said thermostat that heat therefrom, when energized, affects said thermo-responsive switch and a conductor leading from one terminal of said lamp to said electric source, a manual switch associated with said heat-supply controlling device so connected that when operated it causes said heat-supply controlling device to be operated by said electric source to increased heat position and circuit means controlled by said heat-supply control means to energize said lamp when the control means has been thus operated to increased heat position, irrespective of the position of the thermo-responsive switch.

5. In a temperature control system of the type having a thermostat including a thermo-responsive switch, a heat-supply controlling device, a plurality of conductors connecting said switch to said heat-supply controlling device, and an electric source connected to for operating said heat-supply controlling device; the combination of a supplemental heat source in heat conductive relation to said thermo-responsive switch and a conductor leading from one terminal of said heat source to said electric source, a manual switch associated with said heat-supply controlling device so connected that when operated it causes said heat-supply controlling device to be operated by said electric source to increased heat position and circuit means controlled by said heat-supply control means to energize said heat source when the control means has been thus operated to increased heat position, irrespective of the position of the thermo-responsive switch.

6. In a temperature control system of the type having a thermostat including a thermo-responsive switch, a heat-supply controlling device, a plurality of conductors connecting said switch to said heat-supply controlling device, and an electric source connected to for operating said heat-supply controlling device; the combination of a lamp so associated with said thermostat that heat therefrom, when energized, affects said thermo-responsive switch and a conductor leading from one terminal of said lamp to said electric source, a manual switch associated with said heat-supply controlling device so connected that when operated to one position it causes said heat-supply controlling device to be operated by said electric source to increased heat position and circuit means controlled by said heat-supply control means to energize said lamp when the control means has been thus operated to increased heat position, irrespective of the position of the thermo-responsive switch, said manual switch being also so arranged and connected that when moved to another position it causes said heat-supply controlling device to be operated by said electric source to decreased heat position and to de-energize said lamp irrespective of the position of said thermo-responsive switch.

CARL H. DICKE.

REFERENCES CITED

The following references are of record in the file of this patent:

UNITED STATES PATENTS

| Number | Name | Date |
|---|---|---|
| 1,583,496 | Shafer | May 4, 1926 |
| 1,835,307 | Johnson | Dec. 8, 1931 |
| 1,876,636 | Dicke | Sept. 13, 1932 |
| 1,981,251 | Roth | Nov. 20, 1934 |
| 2,110,192 | Bellamy | Mar. 8, 1938 |
| 2,129,477 | Parks | Sept. 6, 1938 |
| 2,164,352 | Sargent | July 4, 1939 |
| 2,300,839 | Dicke | Nov. 3, 1942 |
| 2,301,383 | Dillman | Nov. 10, 1942 |
| 2,342,126 | Dicke | Feb. 22, 1944 |
| 2,402,177 | Miller | June 18, 1946 |